(12) United States Patent
Davis et al.

(10) Patent No.: US 9,639,427 B1
(45) Date of Patent: May 2, 2017

(54) BACKING UP DATA STORED IN A DISTRIBUTED DATABASE SYSTEM

(75) Inventors: Jeremy Davis, San Diego, CA (US); P. Keith Muller, San Diego, CA (US)

(73) Assignee: Teradata US, Inc., Dayton, OH (US)

(*) Notice: Subject to any disclaimer, the term of this patent is extended or adjusted under 35 U.S.C. 154(b) by 2229 days.

(21) Appl. No.: 12/277,754

(22) Filed: Nov. 25, 2008

(51) Int. Cl.
*G06F 7/00* (2006.01)
*G06F 11/14* (2006.01)

(52) U.S. Cl.
CPC ............................ *G06F 11/1451* (2013.01)

(58) Field of Classification Search
CPC ............ G06F 11/1458; G06F 11/1464; G06F 11/1448; G06F 11/1451; G06F 11/1456
USPC ................... 707/640, 661, 636, 652, 654
See application file for complete search history.

(56) References Cited

U.S. PATENT DOCUMENTS

| | | | |
|---|---|---|---|
| 5,899,998 A * | 5/1999 | McGauley et al. | 709/201 |
| 6,023,710 A * | 2/2000 | Steiner et al. | |
| 6,154,852 A * | 11/2000 | Amundson et al. | 714/5.11 |
| 7,330,997 B1 * | 2/2008 | Odom | 714/6 |
| 7,469,274 B1 * | 12/2008 | Ryu et al. | 709/214 |
| 7,657,581 B2 * | 2/2010 | Orenstein | G06F 11/2097 705/51 |
| 7,752,169 B2 * | 7/2010 | Rhodes | 707/640 |
| 8,412,822 B1 * | 4/2013 | Weinman, Jr. | 709/225 |
| 2004/0117438 A1 * | 6/2004 | Considine | G06F 11/2074 709/203 |
| 2005/0131740 A1 * | 6/2005 | Massenzio et al. | 705/2 |
| 2006/0026219 A1 * | 2/2006 | Orenstein et al. | 707/204 |
| 2006/0129940 A1 * | 6/2006 | Rajarajan et al. | 715/738 |
| 2006/0271601 A1 * | 11/2006 | Fatula, Jr. | G06F 11/1464 |
| 2007/0073791 A1 * | 3/2007 | Bruce et al. | 707/204 |
| 2007/0100913 A1 * | 5/2007 | Sumner et al. | 707/204 |
| 2007/0124349 A1 * | 5/2007 | Taylor | 707/204 |
| 2007/0192552 A1 * | 8/2007 | Dutta et al. | 711/162 |
| 2007/0214196 A1 * | 9/2007 | Garimella et al. | 707/204 |
| 2008/0126445 A1 * | 5/2008 | Michelman | 707/204 |
| 2008/0177994 A1 * | 7/2008 | Mayer | 713/2 |
| 2008/0235299 A1 * | 9/2008 | Haselton et al. | 707/204 |
| 2009/0150431 A1 * | 6/2009 | Schmidt et al. | 707/103 R |
| 2009/0249005 A1 * | 10/2009 | Bender et al. | 711/162 |
| 2009/0300137 A1 * | 12/2009 | Tyhurst et al. | 709/217 |
| 2010/0021127 A1 * | 1/2010 | Saito | 386/54 |

\* cited by examiner

*Primary Examiner* — Tony Mahmoudi
*Assistant Examiner* — Linh Black
(74) *Attorney, Agent, or Firm* — Trop, Pruner & Hu, P.C.

(57) ABSTRACT

To back up data stored in a distributed database system, a backup utility is configured with information regarding locations of data stored in the distributed database system having a plurality of nodes. The backup utility retrieves, based on the information regarding locations of data stored in the distributed database system, backup data from the plurality of nodes for backup storage.

18 Claims, 2 Drawing Sheets

BACKING UP DATA STORED IN A DISTRIBUTED DATABASE SYSTEM

BACKGROUND

A database system provides a central repository of data that can be easily accessible by one or more users. For enhanced performance, a database system can be a parallel or distributed database system that has a number of nodes, where each node is associated with a corresponding storage subsystem. Data is distributed across the storage subsystems of the associated multiple nodes. Upon receiving a query for data, the distributed database system is able to retrieve responsive data that is distributed across the nodes and return an answer set in response to the query.

The individual nodes of the distributed database system process the query independently to retrieve the portion of the answer set that is owned by the corresponding node. A benefit offered by many distributed database systems is that the originator of the request can make a database-wide query and not be concerned about the physical location of the data in the distributed database system. Different portions of the answer set are typically gathered at the nodes of the distributed database system, with the different portions collectively making up the complete answer set that is provided to the originator of the request. There can be a substantial amount of node-to-node transfers of data as the different portions of the answer set are collected at various nodes of the database system. The node-to-node transfer of data is performed over a database system interconnect that connects the nodes.

Although such approach is efficient when retrieving data in response to queries during normal database operations, such an approach may not be efficient when backing up or archiving data that is stored in the distributed database system. Substantial node-to-node communications between the multiple nodes of the distributed database system during a backup or archive operation can result in significant consumption of the database system interconnect bandwidth, which reduces the bandwidth available to satisfy normal database query operations.

SUMMARY

In general, a backup utility is configured with information regarding locations of data stored in the distributed database system having a plurality of nodes. The backup utility retrieves, based on the information regarding locations of data stored in the distributed database system, backup data from the plurality of nodes for backup storage.

Other or alternative features will become apparent from the following description, from the drawings, and from the claims.

DETAILED DESCRIPTION

A technique of backing up data stored in a parallel or distributed database system involves configuring a backup utility with information regarding locations of data stored in the distributed database system. According to the information regarding locations of data, backup data can be retrieved from at least some of the nodes of the distributed database system in an intelligent manner that avoids unnecessary communication of backup data over a database interconnect that connects the nodes of the distributed database system. In some embodiments, distinct sessions or connections are established between the backup utility and each of the nodes of the database system for the purpose of transporting backup data. A "backup utility" refers to a module (implemented with software or a combination of software and hardware) that manages backing up of data in the database system. As used here, "backing up" data refers to storing a copy of the data to provide redundancy in case of failure of the primary data. "Backing up" data can also mean archiving data, which involves moving the data from a primary storage location to an alternative storage location (the archived data no longer resides in the primary storage location, but instead is moved to the alternative location).

A parallel or distributed database system refers to a database system that has multiple nodes (which are distinct processing elements) that are able to store and retrieve data in corresponding distinct storage subsystems such that the writing or reading of data can be performed in parallel for improved throughput. Establishing a "session" or "connection" between a backup utility and each of the nodes of the distributed database system refers to establishing a separately identifiable flow of data between the backup utility and the nodes; in other words, establishing multiple sessions or connections between the backup utility and the nodes means that multiple distinctly identifiable flows of data are possible.

By establishing distinct sessions based on the information regarding locations of data for the purpose of transporting backup data between each of at least some of the nodes and the backup utility, unnecessary node-to-node transfers of backup data can be avoided, such that database system interconnect bandwidth is not unnecessarily consumed by such node-to-node communications of backup data.

In the embodiment above in which distinct sessions are established to retrieve backup data, the backup utility is run on a backup server. In an alternative embodiment, an instance of the backup utility can be run on each of the nodes of the distributed database system. Based on the information regarding locations of data, each backup utility instance is able to retrieve the relevant subset of the backup data located at the corresponding node, such that unnecessary communication of backup data over the database interconnect can be avoided.

Figure 1:
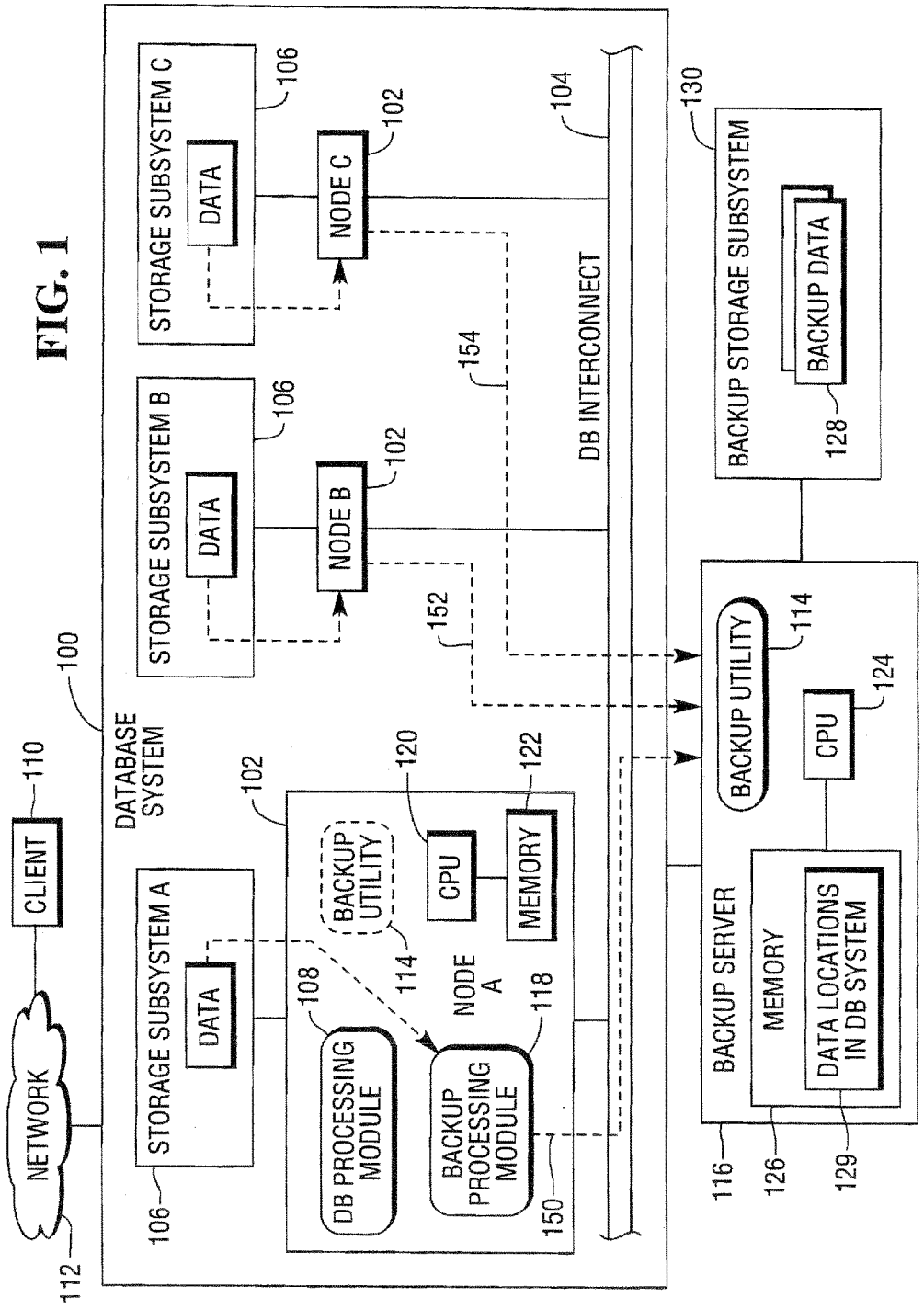
FIG. 1 is a block diagram of an exemplary distributed or parallel database system in which an embodiment of the invention is incorporated.

FIG. 1 illustrates an exemplary distributed database system 100 that has multiple nodes 102 that are interconnected by a database interconnect 104. The interconnect can be implemented with wired or wireless links (e.g., conductive traces, cables, radio frequency carriers, etc.). Each node 102 is connected to a corresponding database storage subsystem 106. Data stored in the database system 100 can be distributed across the database storage subsystems 106 for parallel access (read or write).

Each node 102 includes a database processing module 108 that is able to receive a database query from a client 110 over a network 112, which can be a local network or a public network (e.g., the Internet). A database query, which can be a Structured Query Language (SQL) query, received by a database processing module 108 can be forwarded to multiple nodes 102 for the multiple nodes 102 to independently process the query. Each database node 102 can then retrieve or write the corresponding data in the respective database storage subsystem 106. In the example of a read query, the nodes 102 can provide data over the database interconnect 104. In the process of retrieving the distributed data, there can be communication of data between the various nodes 102 for the purpose of gathering the data for provision in a complete answer set that can be provided back to the client 110.

However, in accordance with some embodiments, to avoid unnecessary consumption of the database interconnect bandwidth during backup operations, the node-to-node communication of backup data is reduced. In one embodiment, this is accomplished by establish distinct backup sessions between database system nodes 102 (identified based on information 129 regarding locations of data in the distributed database system) and a backup utility 114, which can be executable in a backup server 116, as illustrated in the example of FIG. 1. Separate backup sessions are illustrated by dashed lines 150, 152, and 154, which are sessions between the backup utility 114 and the corresponding nodes 102.

As illustrated in the example of FIG. 1, backup data is communicated separately from each of the database storage subsystems 106 to the backup utility 114 (through corresponding nodes 102). For example, in FIG. 1, backup data is transported from database storage subsystem A through node A (in session 150) to the backup utility 114. Similarly, backup data from database storage subsystem B is communicated through node B to the backup utility 114, and backup data from database storage subsystem C is communicated through node C to the backup utility 114. Backup data communicated to the backup utility 114 is stored by the backup utility 114 as backup data 128 in a backup storage subsystem 130.

The communication of backup data through the nodes 102 is controlled by corresponding backup processing modules 118 that are executable in corresponding nodes 102. The database processing module 108 and backup processing module 118 are software modules that are executable on one or more central processing units (CPUs) 120 in each respective node 102. Each CPU 120 can be connected to a corresponding memory 122. Similarly, the backup utility in the backup server 116 can be executable on one or more CPUs 124 in the backup server 116. The CPU(s) 124 can be connected to a memory 126 in the backup server 116.

By using techniques according to some embodiments the backup utility 114 does not have to rely on database processing modules 108 in the database nodes 102 to retrieve backup data.

In some embodiments, the communication of backup data can be provided over the same database interconnect 104 as for primary traffic during normal database operations. In an alternative embodiment, a dedicated backup data communication path (separate from the primary database system interconnect) can be provided for transporting backup data to the backup utility 114.

In an alternative embodiment, instead of providing the backup utility 114 in the backup server 116 that is separate from the database system 100, it is noted that an instance of the backup utility 114 can be provided in each of the nodes 102. In such an embodiment, the backup server 116 can be omitted, with direct input/output (I/O) used for writing backup data to the backup storage subsystem 130. Each backup utility instance can then retrieve the relevant subset of backup data at the corresponding node based on the information 129 relating to locations of data.

As noted above, the backup utility 114 according to some embodiments is configured with knowledge of locations of data stored in the database system 100. Such knowledge can be provided in the form of the information 129 regarding locations of data in the database system 100. The information 129 can be created based on information provided by the database processing modules 108 that execute in the nodes 102. Using the information 129, the backup utility 114 knows where data is stored in the database system 100, such that the backup utility 114 can establish corresponding sessions for transporting backup data from the database system 100 to the backup utility 114. In other words, the backup utility 114 does not have to rely upon the database processing modules 108 in the database nodes 102 for gathering and collecting the backup data into a complete set for communication to the backup utility 114. The process of collecting and gathering data by the database processing modules 108 would involve node-to-node communication of backup data over the database interconnect 104, which would consume valuable database interconnect bandwidth.

Figure 2:
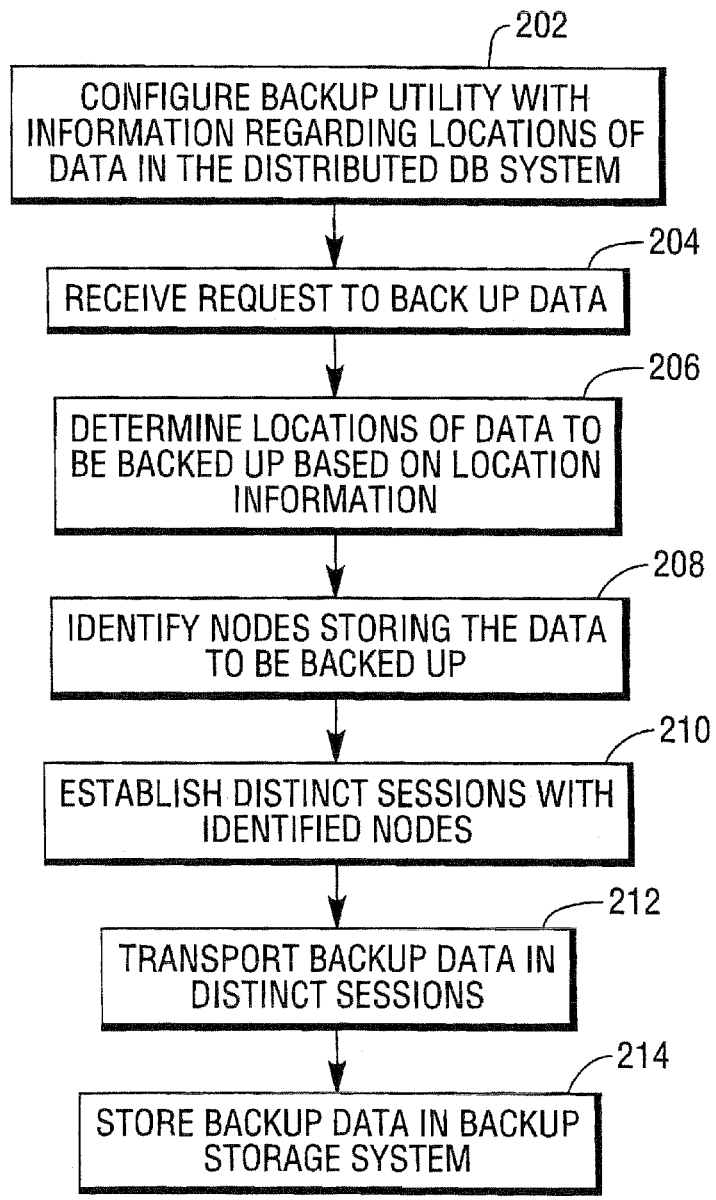
FIG. 2 is a flow diagram of a process of backing up data, according to an embodiment.

FIG. 2 is a flow diagram of a general process according to one embodiment performed by the database system 100 and/or backup server 116 of FIG. 1. The backup utility 114 is configured (at 202) with information (129) regarding locations of data in the distributed database system. The configuring of the backup utility 114 can involve the backup utility 114 receiving updates of data locations from the database processing modules 108 in the database system 100.

Next, the backup utility 114 receives (at 204) a request to back up data (e.g., copy a portion of the data stored in the database system 100 to a backup location for redundancy, move a portion of the data in the database system 100 to an alternative location for archiving purposes, and so forth). The request to back up data may be received from a remote console (e.g., computer of a database administrator), or at a control interface of the backup server 116. Alternatively, the request to back up data can he an automatically generated request that is provided periodically or in response to certain predefined events.

Next, the backup utility 114 determines (at 206) locations of data to be backed up based on the location information (129). Based on such determination, the backup utility 114 then identifies (at 208) the nodes that store the data that is to be backed up.

The backup utility 114 then establishes (at 210) distinct backup sessions with the identified nodes. The backup data is then transported (at 212) in the distinct backup sessions from the corresponding nodes 102 to the backup utility 114. Upon receipt of the backup data, the backup utility stores (at 214) the backup data in the backup storage subsystem 130.

In an alternative embodiment, instead of establishing distinct sessions between the backup utility 114 running on the backup server 116, the backup utility 114 can instead create an instance on each of the plurality of nodes of the distributed database system. Then, in response to a request to backup data, each backup utility instance can access the information 129 regarding locations of data to retrieve the corresponding subset of backup data, while reducing or minimizing communication of backup data over the database interconnect.

The various tasks discussed above can be performed by software (e.g., backup utility 114, backup processing module 118, and database processing module 108). Instructions of such software are loaded for execution on a processor (such as CPUs 120 or 124 in FIG. 1). The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of backing up data stored in a distributed database system, comprising:
    configuring a backup utility in a backup server with information regarding locations of data stored in the distributed database system having a plurality of nodes, wherein the distributed database system is configured to respond to a database query by gathering data from multiple ones of the plurality of nodes and providing the gathered data in an answer set responsive to the database query, wherein gathering the data comprises communication of a subset of the data between at least two of the multiple nodes;
    receiving, by the backup utility, a request for backup storage of a data portion;
    in response to the request, establishing, between the backup utility and respective ones of the plurality of nodes of the distributed database system, distinct corresponding sessions;
    retrieving, by the backup utility based on the information regarding locations of data stored in the distributed database system, the data portion from the plurality of nodes for processing the request, wherein retrieving the data portion comprises retrieving the data portion for processing the request from the plurality of nodes in respective ones of the distinct sessions; and
    communicating, by the backup utility, the retrieved data portion to a backup storage subsystem separate from the distributed database system, the communicating causing storing of the retrieved data portion at the backup storage subsystem to provide a backup copy of the data portion.

2. The method of claim 1, wherein establishing the distinct sessions comprises establishing the distinct sessions based on the information regarding the locations of the data stored in the distributed database system.

3. The method of claim 1, wherein retrieving the data portion for processing the request for backup storage from the plurality of nodes in respective ones of the distinct sessions comprises communicating the data portion from the plurality of nodes in respective ones of the distinct sessions to the backup utility over a database system interconnect, wherein the database system interconnect interconnects the plurality of nodes.

4. The method of claim 3, further comprising:
    communicating data responsive to the database query over the database system interconnect to provide the answer set to a client computer in response to the database query, the client computer different from the backup server.

5. The method of claim 1, wherein the gathered data is communicated over a database system interconnect interconnecting the plurality of nodes,
    wherein retrieving the data portion for processing the request for backup storage from the plurality of nodes in respective ones of the distinct sessions to the backup utility is over another interconnect separate from the database system interconnect.

6. The method of claim 1, wherein the distributed database system includes additional nodes in addition to the plurality of nodes, the method further comprising:
    in response to the request, identifying, based on the information regarding locations of data, the plurality of nodes that are less than all nodes in the distributed database system, wherein the identified plurality of nodes are computer nodes that contain the data portion to be backed up for the request.

7. An article comprising at least one non-transitory computer-readable storage medium containing instructions that when executed cause a backup utility executable on a backup server including at least one processor to:
    receive a single request to back up a data portion stored in a distributed database system having a plurality of nodes, each of the plurality of nodes including a central processing unit (CPU), wherein the distributed database system is configured to respond to a database query by gathering data from multiple ones of the plurality of nodes and providing the gathered data in an answer set responsive to the database query, wherein gathering the data comprises communicating a subset of the data between at least two of the multiple nodes;
    in response to the single request to back up the data portion, access information identifying locations of data in the distributed database system;
    identify nodes from among the plurality of nodes of the distributed database system that contain the data portion to be backed up for the single request;
    establish, between the backup utility and respective ones of the identified nodes of the distributed database system, distinct corresponding sessions;
    retrieve the data portion from the identified nodes for processing the single request, wherein retrieving the data portion comprises retrieving the data portion for processing the request from the identified nodes in respective ones of the distinct sessions; and
    communicate the retrieved data portion to a backup storage subsystem separate from the distributed database system, the communicating causing storing of the retrieved data portion at the backup storage subsystem, to provide a backup copy of the data portion stored in the distributed database system.

8. The article of claim 7, wherein plural parts of the data portion are retrieved from corresponding ones of the identified nodes in the distinct corresponding sessions.

9. The article of claim 8, wherein the instructions when executed cause the backup utility to further receive the plural parts of the data portion in the distinct sessions over a database system interconnect that connects the plurality of nodes of the distributed database system.

10. The article of claim 8, wherein the backup server is separate from the distributed database system.

11. The article of claim 8, wherein the instructions when executed cause the backup utility to further run an instance of the backup utility on each of the plurality of nodes of the distributed database system to retrieve the data portion.

12. A system comprising:
 a distributed database system having:
  a plurality of nodes each including a central processing unit (CPU), and
  storage subsystems associated with the plurality of nodes, wherein the distributed database system is configured to respond to a database query by gathering data from multiple ones of the plurality of nodes and providing the gathered data in an answer set responsive to the database query, wherein gathering the data comprises communication of a subset of the data between at least two of the multiple nodes;
 at least one processor; and
 a backup utility executable on the at least one processor to:
  receive a single request for backup storage of a data portion;
  in response to the single request, access information regarding locations of data stored in the distributed database system;
  in response to the single request, establish distinct backup sessions between the backup utility and at least some nodes of the plurality of nodes, the at least some nodes identified based on the information regarding locations of data; and
  in response to the single request, retrieve, based on the information regarding locations of data stored in the distributed database system, the data portion in the distinct backup sessions from corresponding ones of the at least some nodes for storing in a backup storage subsystem.

13. The database system of claim 12, wherein the data portion of the single request comprises a copy of data in the database system to be stored at the backup storage subsystem.

14. The database system of claim 12, wherein the data portion of the single request comprises archived data to be stored at the backup storage subsystem.

15. The article of claim 7, wherein the identifying of the nodes is based on the information identifying locations of data in the distributed database subsystem.

16. The method of claim 1, wherein retrieving the data portion comprises retrieving plural parts of the data portion from the corresponding plurality of nodes in the distinct corresponding sessions.

17. The method of claim 1, wherein the backup server is separate from the distributed database system.

18. The system of claim 12, wherein the backup utility is executable to further communicate the retrieved data portion to the backup storage subsystem that is separate from the distributed database system, the communicating causing storing of the retrieved data portion at the backup storage subsystem, to provide a backup copy of the data portion stored in the distributed database system.

\* \* \* \* \*